United States Patent [19]

Jacobs et al.

[11] Patent Number: 4,464,681
[45] Date of Patent: Aug. 7, 1984

[54] METHOD AND APPARATUS FOR ADJUSTING A FACSIMILE DOCUMENT SCANNER

[75] Inventors: Norman A. Jacobs, Arlington Heights; Jagdish T. Madhav, Morton Grove, both of Ill.

[73] Assignee: Teletype Corporation, Skokie, Ill.

[21] Appl. No.: 368,619

[22] Filed: Apr. 15, 1982

[51] Int. Cl.³ .............................................. H04N 1/10
[52] U.S. Cl. .................................... 358/285; 358/293; 358/294
[58] Field of Search ................ 358/293, 294, 285, 256

[56] References Cited

U.S. PATENT DOCUMENTS

| | | | |
|---|---|---|---|
| 3,584,144 | 6/1971 | Shepard | 358/293 |
| 4,081,842 | 3/1978 | Harbaugh | 358/294 |
| 4,318,135 | 3/1982 | Allis | 358/293 |
| 4,358,794 | 11/1982 | Kurakami | 358/294 |

Primary Examiner—Howard W. Britton
Attorney, Agent, or Firm—W. K. Serp

[57] ABSTRACT

A facsimile document scanner 10 is illustrated which includes an optical system 23 having a folded optical path 40 and an adjustable lens system 42. A test pattern 60 in the form of a plurality of alternate light and dark stripes 64, 66 is focused upon a linear photodiode array 50 mounted in an integratd circuit pack 51. The number of light and dark stripes 64, 66 is equal to the number of photodiodes in the linear photodiode array 50 across the document width. For adjustment purposes, an oscilloscope 70 is connected to a serial output from the integrated circuit pack 50 and the position of the lens system along the optical path 42 is adjusted and a corresponding adjustment is made to the pointer of the lens holder 45 within the lens housing 43 to obtain the desired image size and focus. The position of the diode array 50 is adjusted with respect to the focused image 72, 74 to obtain the maximum display amplitude.

8 Claims, 8 Drawing Figures

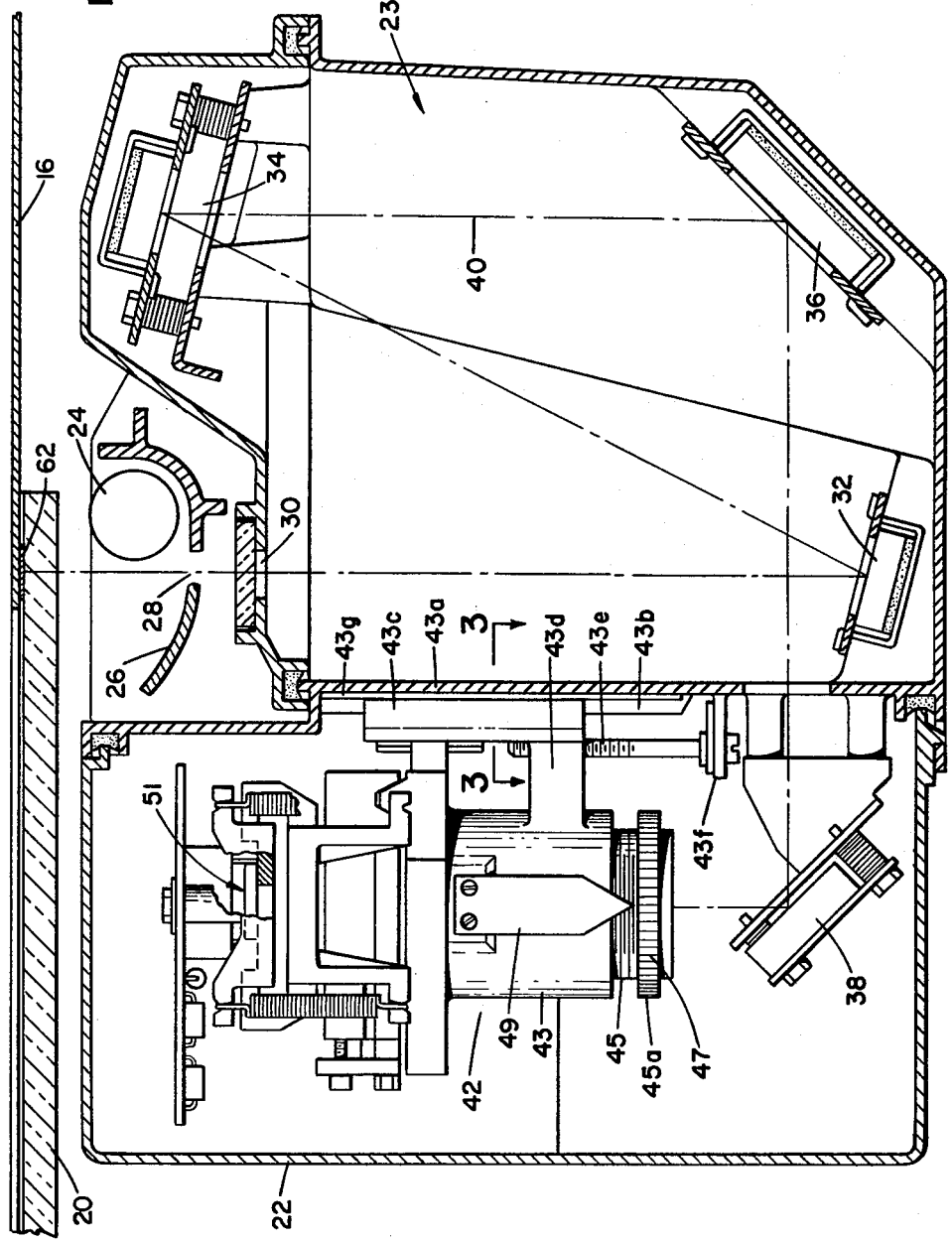
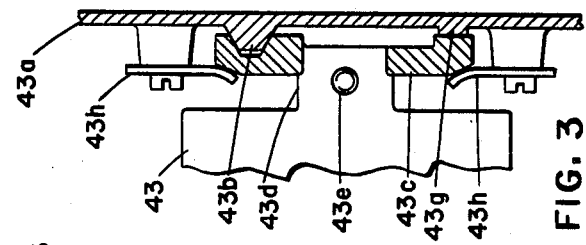

METHOD AND APPARATUS FOR ADJUSTING A FACSIMILE DOCUMENT SCANNER

DESCRIPTION

1. Technical Field

This invention relates to a method and apparatus for adjusting a facsimile document scanner.

2. Background Art

In facsimile systems, various types of apparatus have been suggested for optically scanning a document and for converting the information on the document into electrical signals for transmission to a receiving device which produces a copy of the original document. In such document scanners, the document is placed on a flat transparent pane forming a document support surface and the scanning mechanism views the document through the pane. The scanning mechanism includes an optical system for focusing selected portions of the document upon photosensitive cells which generate electrical signals related to the light level falling upon the cells. A particular problem with such document scanners is the difficulty of adjusting the optical system and the position of the photosensitive cells to obtain the desired size, focus and location of the image upon the photosensitive cell(s). The method and apparatus disclosed provides rapid, accurate and convenient adjustment of a facsimile document scanner.

DISCLOSURE OF THE INVENTION

In accordance with this invention, an apparatus for adjusting a facsimile document scanner includes an adjustable optical system for focusing an image onto a linear photo diode array mounted within an integrated circuit pack. A test pattern having a plurality of alternating light reflecting and light absorbing stripes of the same width is positioned as the object for the optical system. The image of the test pattern through the optical system produces an image pattern on the linear photo diode array with the light and dark areas of the image each being generally the width of the individual photo cells of the array. A frequency measuring device receives a serial output signal from the photo diode array integrated circuit pack and provides a visual display of the size and position of the pattern image relative to the size and position of the linear photo diode array.

Preferably, the adjustable optical system includes a folded optical path defined by a plurality of spatially positioned mirrors. The optical system also includes an adjustable focusing lens system for focusing the image of the test pattern onto the photo diode array.

The invention is also directed to a method for adjusting a facsimile document scanner having an adjustable optical system for focusing the image onto a linear photo diode array mounted within an integrated circuit pack. The step of connecting an oscilloscope to a serial output of the linear diode array integrated circuit pack is included as well as positioning a test pattern having a plurality of equal width stripes of alternating light reflective quality as an object of the optical system. Additionally, the method includes the steps of adjusting the optical system to obtain a uniform signal display on the oscilloscope from the serial output of the photodiode array integrated circuit pack and adjusting the position of the linear diode array to maximize the magnitude of the displayed signal on the oscilloscope.

THE DRAWING

FIG. 2 is a full sectional view of a portion of the facsimile document scanner of FIG. 1 taken along the line 2—2 of FIG. 1 and with the carriage assembly in an adjustment position;

FIG. 3 is a sectional view along the line 3—3 of FIG. 2.

DETAILED DESCRIPTION

Figure 1:
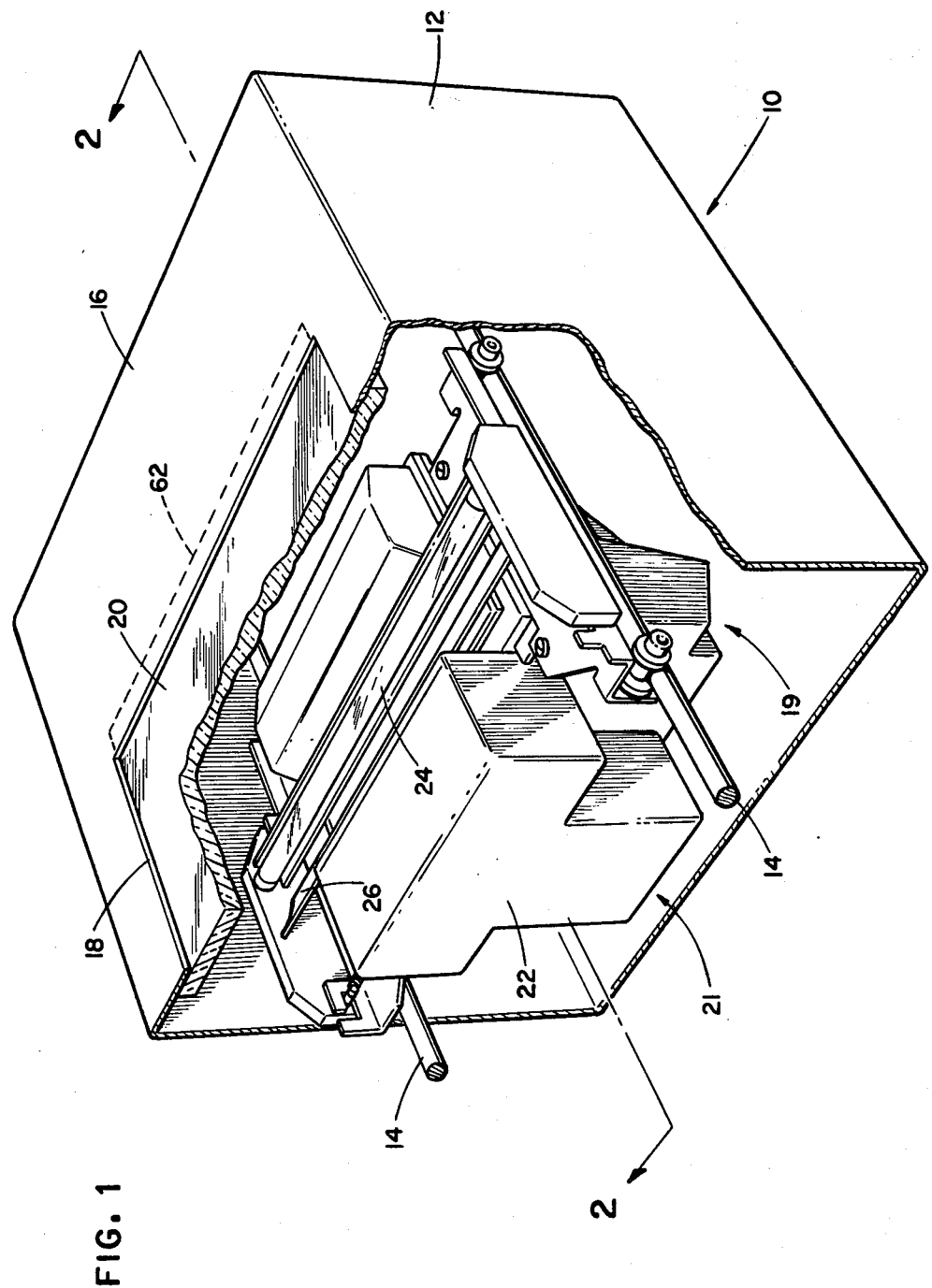
FIG. 1 is a perspective view of a facsimile document scanner with a portion of the cabinet removed to more clearly show certain features thereof.

In FIG. 1, a document scanner 10 is shown which includes a cabinet 12 having firmly mounted therein a pair of guide rails 14. The top wall 16 of the cabinet 12 has a rectangular opening 18 covered with a transparent glass pane 20 providing a document support surface. A carriage assembly 21, including an optical housing 22, supported on and driven along the rails 14 by a motor (not shown). The carriage assembly 21 has a light source in the form of a florescent bulb 24 for illuminating a selected portion of the document to be scanned. The bulb 24 is positioned within a reflector 26 which serves to direct the light from the bulb 24 onto the desired location of the document (not shown). The reflector 26 has a slit 28 along its length through which the light reflected from the document passes into the housing 22 through a viewing aperture 30.

An optical system 23 (FIG. 2) is supported within the housing 22 and includes four front surface mirrors 32, 34, 36 and 38 defining a folded optical path symbolically illustrated by a phantom line 40. A suitable mounting apparatus for the mirrors 32, 34, 36 and 38 is described in U.S. Pat. Application Ser. No. 06/201,896 filed Oct. 29, 1980 in the name of F. E. Huntoon entitled, "An Apparatus For Mounting A Mirror", now U.S. Pat. No. 4,372,519, and having a common assignee with this application. The mirrors 32 and 36 are maintained in a fixed position while the mirrors 34 and 38 are movable to allow accurate positioning of the optical path 40 into an adjustable lens assembly 42 mounted to an inner wall 43 of the housing 22. The adjustable lens assembly 42 includes a housing 43 mounted to the wall 43a. As illustrated in FIG. 3, formed with the wall 43a are a pair of guide tracks 43b and 43g which engage the base 43c of the lens housing 43 directing movement of the housing 43 along the optical path 40. A support extension 43d of the holder 43 has a threshold hole into which adjustment screw 43e is threaded. The head of the screw 43e is captively held by a support plate 43f (FIG. 2) mounted to the wall 43a. Serving to retain the holder 43 on the tracks 43b and 43g are a pair of adjustable clamps 43h. Rotation of the screw 43e causes the holder 43 to advance along the tracks 43b and 43g.

A threaded cylindrical lens holder 45 having a lens 45a (FIG. 4) contained therein, screws into the lesn housing 43. Serving to facilitate positioning of the lens holder 45 with respect to the lens housing 43, a ring 45a of the holder 45 is provided about its periphery with a plurality of spaced ridges 47. A reference pointer 49 is secured to the exterior of the lens housing 43. Thus the user can easily determine the amount of rotational movement of the lens holder 45 with respect to the housing 43 by counting the number of ridges 47 which pass the pointer 49 during rotation of the holder 45. Since the pitch of the threads on the holder 45 is known, the amount of linear movement of the lens holder 45 with respect to the lens housing 43 along the optical path 40 can easily be determined. The lens assembly 42 is adjusted to focus the document image onto a linear photodiode array 50 having a plurality of photocells 50a (FIG. 4) mounted within an integrated circuit package 51. The integrated circuit package 51 is firmly mounted to the lens housing 42 and as the lens holder 45 is rotated, the distance between the focusing lens 45a within the lens holder 45 and the photodiode array 50 varies inversely with the distance from the lens 42a to the document (not shown) supported on the pane 20. Rotation of the adjustment screw 43e changes the position of the lens housing 43 along the optical path 40 effectively changing the distance from the lens 42a to the document which changes the magnification ratio and, thus, the size of the image on photodiode 50. It will be appreciated that for each rotation of the screw 43e, a compensating movement of the lens 42a is necessary to maintain focus at the new image size. For example, it may be determined that a half turn of the screw 45e requires a five degree rotation (3 notches) of the lens holder 45 to maintain focus at the new image size. This known relationship enables adjustment of the optical system 23 since a technician can conveniently obtain focus at a new image size by moving the adjustment screw 43e a desired amount and thereafter rotating the lens holder 45 a related amount as determined by the number of notches 47 which move across the pointer 49.

One particular photodiode array found suitable for this application is composed of 1728 close spaced, photosensitive cells positioned in a straight line. When the image of a document 215 mm (i.e. approximately 8½ inches) wide is focused on the photodiode array 50, the resolution is approximately eight lines per milimeter in accordance with the International Telegraph & Telephone Consulative committee (CCITT) facsimile standards. Such an integrated circuit package is manufactured and sold by Fairchild Corporation and designated as part #CCD122H. As mentioned, photodiode array 50 is mounted within an integrated circuit package 51 which also includes a sampling circuit (not shown). The sampling circuit, in response to a control signal, samples the signal lines at each of the photodiodes in the array 50 placing the sampled signal levels into an analog, parallel to serial shift register wherefrom the signal levels are shifted serially to suitable processing circuitry (not shown). Adjustment of the optical system 23 is attained with the aid of a test pattern 60 fixed to the inside of the top wall 16 of the cabinet 12 adjacent the opening 18. The test pattern 60 is uniquely positioned at the illustrated location. In this position, the test pattern does not interfere with the document table 20 nor is the pattern distractingly visible to the user of the scanner 10. The carriage assembly 21, when in the rest or non-scanning position, is located at the far right of the cabinet 12 as shown in FIG. 2 and, when located in this position, the test pattern 60 is located directly above the viewing aperture 30 in the housing 22.

Figure 4:
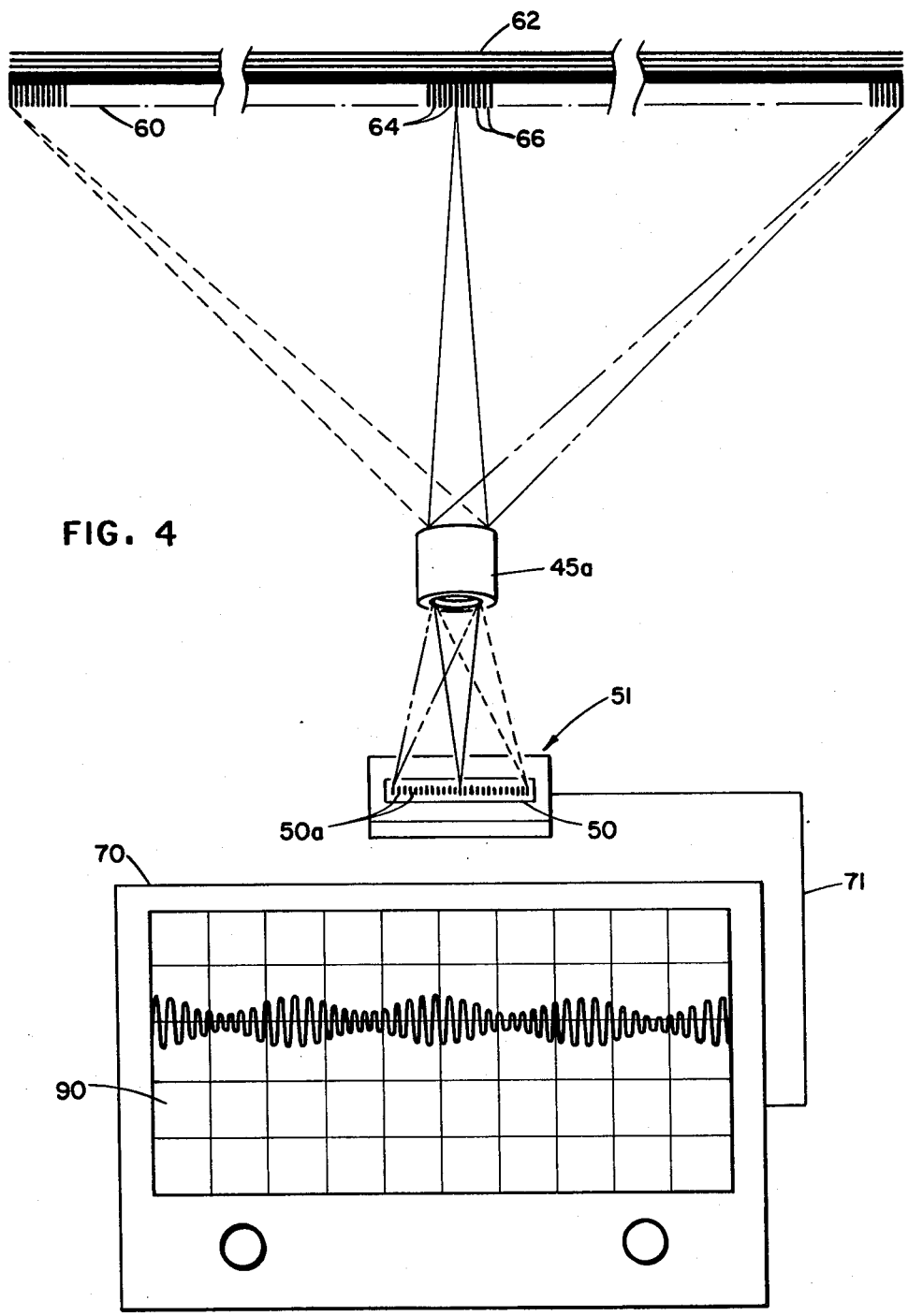
FIG. 4 is a schematic diagram of the optical system of the document scanner of FIG. 1 in combination with an oscilloscope.

As illustrated in FIG. 4, the test pattern 60 is printed upon an elongated strip of paper, mylar or other suitable material. The strip 62 preferably has an adhesive coated back surface to facilitate securing the strip 62 to the inside surface of the top wall 16 of the cabinet 12. The strip 62 displays indicia in the form of a series of alternating light absorbing 64 and light reflecting 66 transverse stripes. All of the stripes 64, 66 are of equal width. The stripes 64, 66 are sized so that over a distance of 215 mm, 1728 alternate dark 64 and light 66 stripes are printed. As shown, the strip 62 also has printed thereon additional test pattern indicia used for other scanner tests, and adjustments which do not pertain to this invention.

To facilitate adjustment of the scanner 10, an oscilloscope 70 is connected to the serial output pin of the photodiode array integrated circuit pack 51. It should be appreciated that other forms of low frequency measuring devices may be used, without departing from the spirit of the invention. FIGS. 5, 6, 7 and 8 illustrate the output signals on line 71 from the integrated circuit package 51 to the oscilloscope 70 corresponding to four adjustment conditions. The horizontal sweep rate of the oscilloscope 70 is adjusted so that it is equal to the time interval during which one complete diode array 50 output, corresponding to a complete line scan will be displayed. FIGS. 5, 6, 7 and 8 illustrate only a small portion of the signal output from the circuit package 51 during one complete document line scan.

Figure 5:
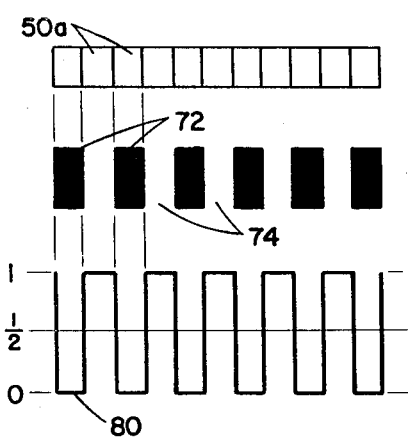
FIGS. 5, 6, 7 and 8 are representations of selected test signals generated by certain adjustment conditions of the document scanner of FIG. 1.
Figure 6:
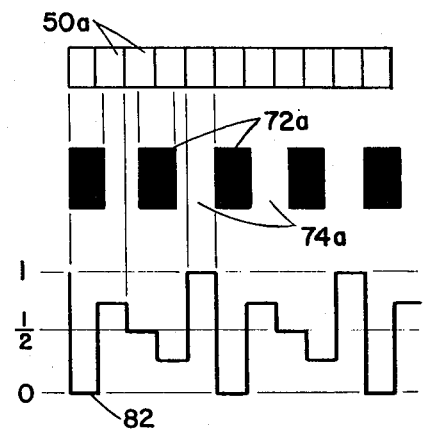
Figure 7:
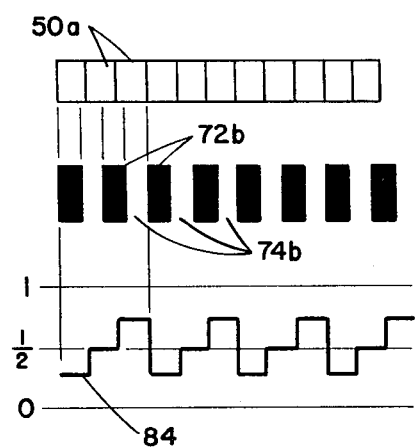
Figure 8:
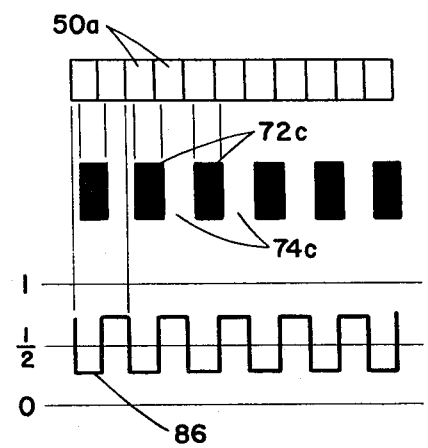

FIG. 5 illustrates the desired condition with image stripes 72, 74 of the pattern 60 symbolically illustrated in perfect registration with and focused on the photocells of the photodiode array 50. When the image of the test pattern 60 is the same size as the photodiode array and when the image is precisely focused upon the photodiode array 50, the dark and light image stripes 72, 74 will fall exactly upon alternate photocells 50a of the photodiode array 50 and a symmetrical wave shape signal 80 of maximum amplitude (FIG. 5) will be fed into the oscilloscope 70 for display. In FIG. 6, the lens assembly 42 is not properly adjusted so that the image of each of the stripes 72a, 74a is wider than each of the photocells 50A of the photodiode array 50 resulting in the illustrated nonsymmetrical wave signal 82 being fed to the oscilloscope 70. In this instance (an extreme condition), the stripes 72a, 74a are illustrated as being twenty-five percent wider than the width of a photocell 50a of the photodiode array 50. FIG. 7 illustrates the condition wherein the size of the image stripes 72b, 74b of the pattern 60 upon the photodiode array 50 are narrower than the width of the photocells 50a by approximately twenty-five percent. This condition generates the illustrated wave shape 84. FIG. 8 illustrates the condition wherein the width of the image stripes 72c, 74c of the pattern 60 are equal in width to the width of the photocells 50a of the photodiode array 50. However, the image stripes 72c and 74c are not in registration with the photocells 50a. Under this condition, the signal to the oscilloscope 70 is uniform but reduced in amplitude when compared to the signal illustrated in FIG. 5 which shows the desired alignment condition.

In FIG. 4, a full screen representation 90 of the oscilloscope 70 is illustrated with a horizontal sweep rate corresponding to the time interval of one complete serial output of the linear array 50. As illustrated, the representation is that of a high frequency signal modulated by a much lower frequency signal. The low frequency signal indicates an optical misalignment of a few percent. Once the adjustment of the optical system 23 is relatively close (within a few percent) such as shown in FIG. 4, the operator visually counts the cycles of the low frequency signal and adjusts the screw 43e by an amount corresponding to the number of "beats" presented on the oscilloscope 70. Thereafter, the operator turns the lens holder 42 while counting the ridges 47 as they pass the pointer 49. The holder 42 is rotated a predetermined amount in the appropriate direction corresponding to the amount of rotation to the advance screw 43e, thus, eliminating the low frequency signal and producing a uniform display. As a further adjustment, the position of the photodiode array 50 may be shifted with respect to the pattern image to obtain a maximum signal output as in FIG. 5.

Although this invention has been shown and described with reference to a preferred embodiment thereof, it will be understood that various changes in form and detail may be made without departing from the scope and spirit of the invention as defined by the following claims.

What is claimed is:

1. An apparatus for adjusting a facsimile document scanner (10) having an adjustable optical system (23) for focusing an image (72, 74) onto a linear photodiode array (50) mounted within an integrated circuit pack (51) comprising:
   a test pattern (60) having a plurality of parallel alternating light reflecting and light absorbing stripes (64, 66), said light reflecting and light absorbing stripes (64, 66) being of equal width and sized so that the image (72, 74) of said test pattern through the optical system (23) will produce an image pattern on the linear photodiode array (50) with the light and dark areas of the image each being generally the width of the photocells (50) of the diode array, and
   a frequency measuring device (70) for receiving a serial output signal from the photodiode array integrated circuit pack (51) and for providing an indication of the size and position of the test pattern image (72, 74) relative to the size and position of the linear photodiode array (50).

2. The apparatus of claim 1 wherein said adjustable optical system includes a folded optical path (40) including a plurality of spacially positioned mirrors (32, 34, 36, 38), and an adjustable lens system (42) for focusing and determining the size of the image (72, 74) of the test pattern on the photodiode array (50).

3. The apparatus of claim 2 wherein said linear diode array (50) is adjustably mounted to facilitate positioning with respect to the test pattern image (72, 74) and at least one of said mirrors (32, 34, 36, 38) is positionally mounted so as to facilitate adjustment of the position of the optical path (40).

4. The apparatus of claims 1 or 2 wherein said adjustable lens system includes a lens housing including a cylindrical lens holder threaded into said lens housing so that rotational movement of the lens holder is translated to linear movement of the holder along the optical path, means for positioning the lens housing along said optical path and a plurality of reference indicia displayed about the circumference of the lens holder providing a visual indication of the relative rotational movement of the lens holder with respect to the lens housing.

5. The apparatus of claim 4 wherein said indicia are in the form of equally spaced ridges about the circumference of the lens holder and a pointer mounted upon said lens housing cooperating with said ridges to provide a visual indication of the relative rotational movement between said lens holder and said lens housing.

6. The apparatus of claim 4 wherein said photodiode array is mounted upon the lens housing and said housing positioning means is in the form of a screw threaded into the housing and rotatably supported by a wall so that rotation of the screw advances the housing along said optical path.

7. A method for adjusting a facsimile document scanner (10) having an adjustable optical system (23) for focusing the image (72, 74) of a test pattern (60) onto a linear photodiode array (50) mounted within an integrated circuit pack comprising the steps of:
   A. Connecting a frequency measuring device (70) to a serial output of the linear photodiode array integrated circuit pack (51),
   B. Positioning a test pattern (60) having a plurality of equal width stripes (64, 66) of alternating light reflective quality as an object of the optical system (23),
   C. Adjusting the optical system (23) to obtain a desired indication on the frequency measuring device (70) from the serial output of the photodiode array integrated circuit pack (51), and
   D. Adjusting the position of the linear diode array (50) to maximize the output of the linear diode array (50).

8. The method of claim 7 wherein said frequency measuring device is an oscilloscope and step C consists of adjusting a lens system (42) forming part of the optical system to obtain a uniform signal presentation by the oscilloscope (70).

* * * * *